United States Patent
Lai

(10) Patent No.: US 7,240,190 B2
(45) Date of Patent: Jul. 3, 2007

(54) RESOURCE COMPATIBLE SYSTEM FOR COMPUTER SYSTEM READS COMPRESSED FILED STORED IN LEGACY BIOS AND DECOMPRESSES FILE USING LEGACY SUPPORT OPERATING SYSTEM DRIVER

(75) Inventor: Yu-Chen Lai, Chung-Ho (TW)

(73) Assignee: Insyde Software Corporation, Taipei (TW)

( * ) Notice: Subject to any disclaimer, the term of this patent is extended or adjusted under 35 U.S.C. 154(b) by 422 days.

(21) Appl. No.: 10/924,394

(22) Filed: Aug. 24, 2004

(65) Prior Publication Data

US 2006/0047941 A1    Mar. 2, 2006

(51) Int. Cl.
*G06F 15/177*    (2006.01)

(52) U.S. Cl. ............................................. 713/2; 713/1
(58) Field of Classification Search .................... 713/1, 713/2
See application file for complete search history.

(56) References Cited

U.S. PATENT DOCUMENTS

| | | | | |
|---|---|---|---|---|
| 5,901,310 A | * | 5/1999 | Rahman et al. ................ | 713/1 |
| 6,961,848 B2 | * | 11/2005 | Fish et al. ...................... | 713/2 |
| 7,032,105 B2 | * | 4/2006 | Lin ................................ | 713/1 |
| 7,080,246 B2 | * | 7/2006 | Rothman et al. .............. | 713/2 |
| 7,120,778 B2 | * | 10/2006 | Zimmer ...................... | 711/202 |
| 7,143,277 B2 | * | 11/2006 | Bulusu et al. .................. | 713/2 |
| 2005/0071616 A1 | * | 3/2005 | Zimmer et al. ................ | 713/1 |
| 2005/0144433 A1 | * | 6/2005 | Rothman et al. .............. | 713/2 |
| 2006/0020780 A1 | * | 1/2006 | Hobson ......................... | 713/2 |
| 2006/0026339 A1 | * | 2/2006 | Rostampour ................ | 711/103 |
| 2006/0041738 A1 | * | 2/2006 | Lai ................................ | 713/2 |

* cited by examiner

*Primary Examiner*—Chun Cao
(74) *Attorney, Agent, or Firm*—Woodard, Emhardt, Moriarty, McNett & Henry LLP

(57) ABSTRACT

A resource compatible system for EFI (Extensible Firmware Interface) and BIOS (Basic Input/Output System) to be used in a computer system having both the EFI and BIOS at the same time. The computer system can execute the EFI first after being powered on, and then when transferring to the BIOS, the resource compatible system will transfer EFI to BIOS.

12 Claims, 2 Drawing Sheets

RESOURCE COMPATIBLE SYSTEM FOR COMPUTER SYSTEM READS COMPRESSED FILED STORED IN LEGACY BIOS AND DECOMPRESSES FILE USING LEGACY SUPPORT OPERATING SYSTEM DRIVER

FIELD OF THE INVENTION

The present invention relates to a resource compatible system and, more particularly, to a resource compatible system for extensible firmware interface and basic input/output system.

BACKGROUND TO THE INVENTION

A computer system contains a low-level firmware, generally known as Basic Input/Output System (BIOS), which is a program stored in a read-only memory (ROM) comprising therein many basic subprograms for computer output and input. After the computer is powered on, the basic input/output system runs first for proceeding initial values setup and power-on self test (POST), and reads out the data (information about hard disk drive size, whether there are CD/DVD-Rom drives or not, system time, whether a shadow random access memory (shadow RAM) is used or not, etc.) stored in the complementary metal-oxide semiconductor (CMOS).

Because the progress in computer technology is quite rapid, the development on the legacy BIOS accompanying the development of computer systems has also reached the limit. Therefore, in order to overcome the bottleneck of the development on the legacy BIOS, Intel Corporation has developed an extensible firmware interface (EFI) specification which can avoid the congenital limit of basic input/output system. Also, such an extensible firmware interface allows the use of standard programming language tools to add new components therein, has better extensibility, and is programmed by C language so that the programs are easy to be maintained and read.

It is believed that such an extensible firmware interface will probably replace the basic input/output system completely in the future. However, the extensible firmware interface system can not be used in computer systems currently using the legacy BIOS. Under the extensible firmware interface environment, conventional operating systems worked under the legacy BIOS before, such as Dos, Windows XP or early Windows versions, can not function; this is because the extensible firmware interface is worked as a 32-bit data environment while the legacy BIOS is worked as a 16-bit data environment, and the extensible firmware interface does not provide service routines for the legacy BIOS such as interrupt service routine. Therefore, although the extensible firmware interface system has the above-mentioned advantages, it is unable to change users who use old computer systems to use the extensible firmware interface system widely in a short period of time.

SUMMARY OF THE INVENTION

The object of the present invention is to provide a resource compatible system for extensible firmware interface and basic input/output system, which allows the extensible firmware interface to be used in general operating systems and still retain the flexibility of downwards-compatible; also, newly adding a legacy BIOS into the extensible firmware interface system will not affect the operation environment of extensible firmware interface and thus can be used in old computer systems.

The present invention intends to provide a resource compatible system for extensible firmware interface and basic input/output system, which is used in a computer system incorporating extensible firmware interface and basic input/output system at the same time. Such a computer system executes the extensible firmware interface system first after being powered on, and then when transferring to the basic input/output system, the resource compatible system executes the following steps: first, starting a mapping random access memory by a legacy OS support driver of the extensible firmware interface; second, finding out a legacy BIOS stored in a read-only memory by the legacy OS support driver; next, reading out a compressed ROM file stored in the legacy BIOS by the legacy OS support driver; then, decompressing the compressed ROM file by the legacy OS support driver and storing it in the mapping random access memory; further, setting up a warm reset vector in the mapping random access memory by the legacy OS support driver; and executing a warm reset action by the legacy OS support driver to enable the computer system to proceed the warm reset procedure.

BRIEF DESCRIPTION OF THE DRAWINGS

One of the preferable embodiments of the present invention will now be described by way of examples with reference to the accompanying drawings in which.

DESCRIPTION OF PREFERRED EMBODIMENTS

Before new generation of computer systems incorporating only extensible firmware interface can be popularized and in view of the fact that most of current computer systems still use only the legacy BIOS, during the transition period, a resource compatible system for extensible firmware interface and basic input/output system of the present invention is provided to allow users to use the computer systems incorporating both extensible firmware interface and basic input/output system at the same time.

Figure 1:
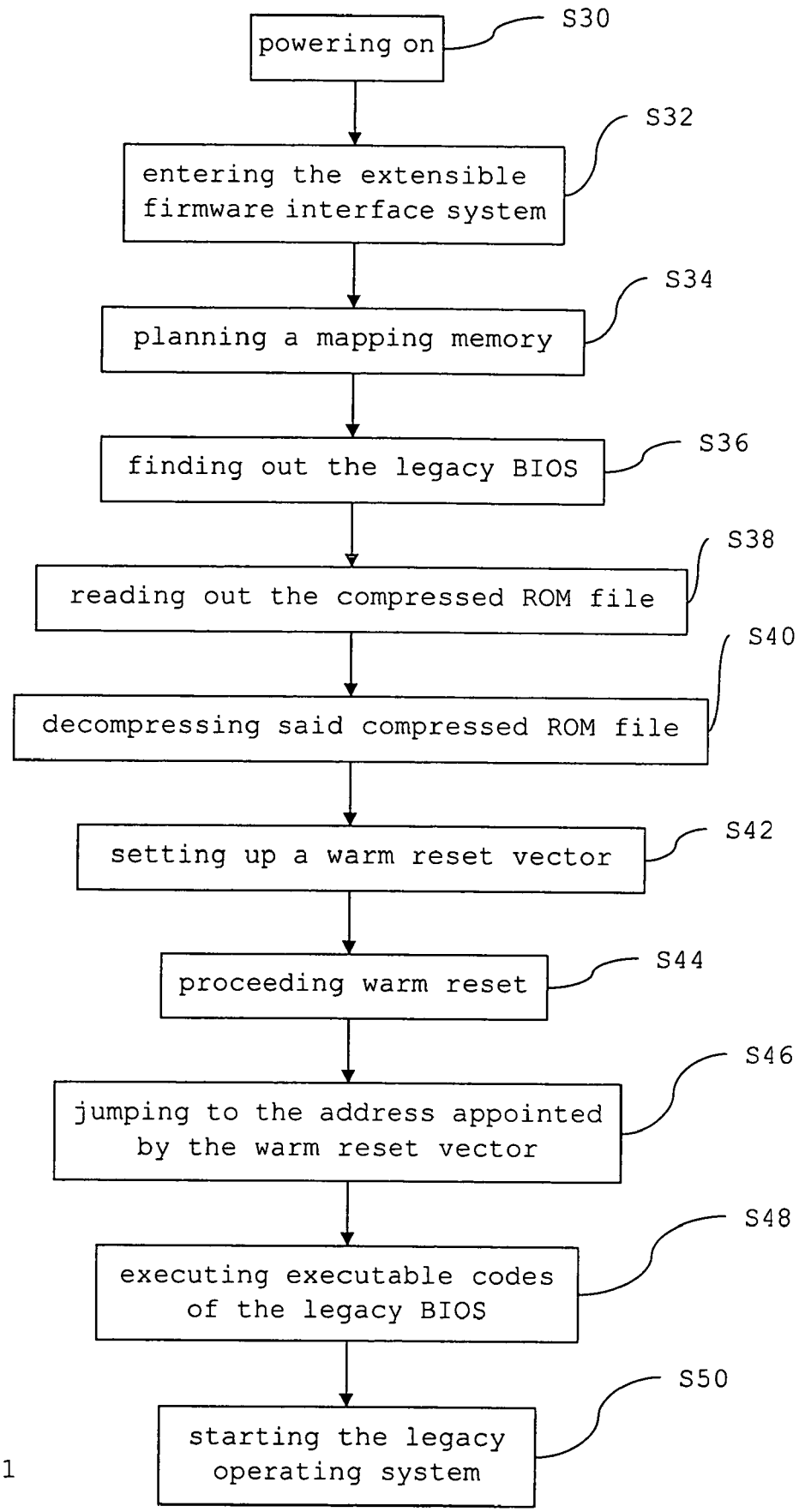
FIG. 1 is a flowchart of the present invention.
Figure 2:
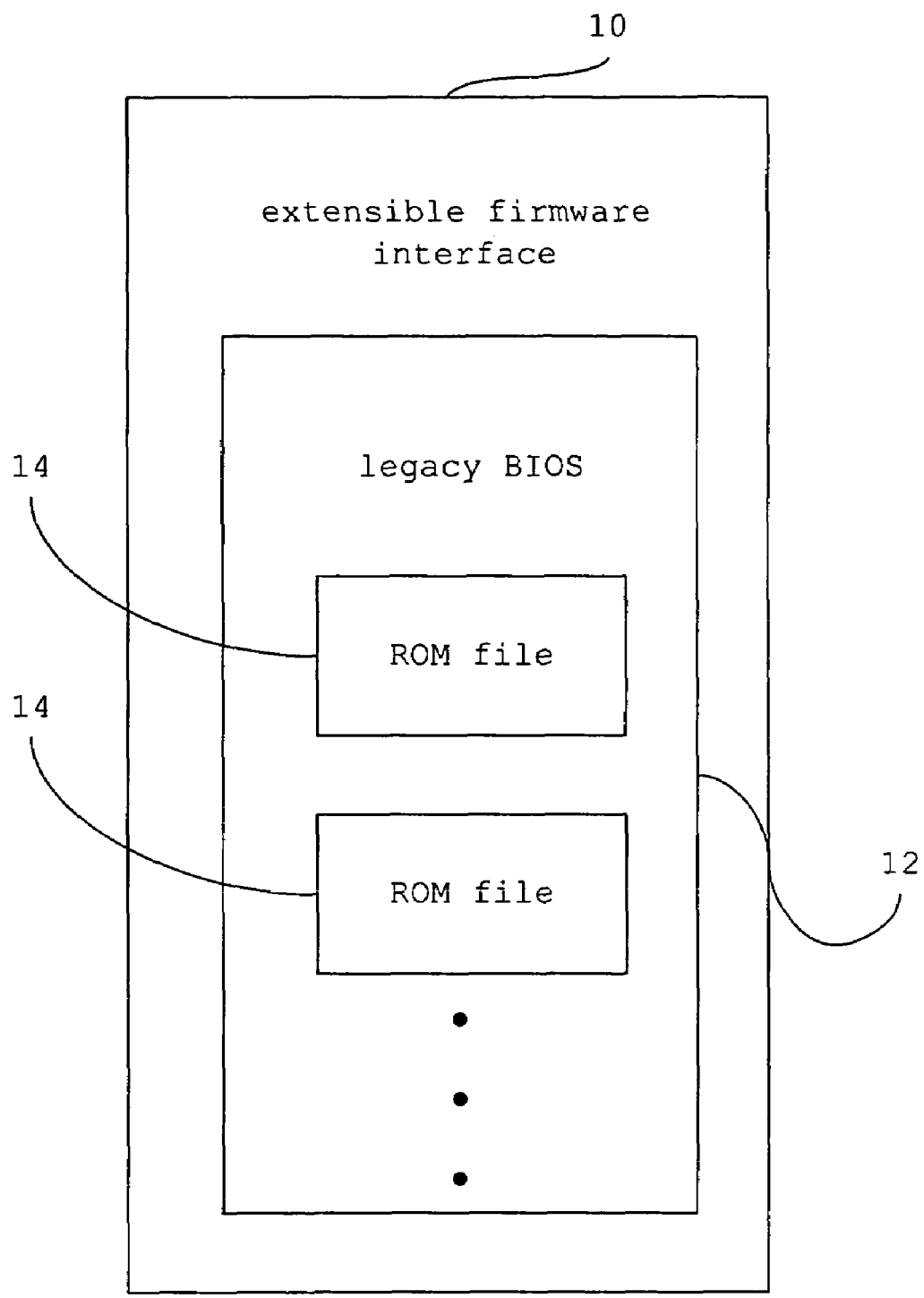
FIG. 2 is a schematic illustration of the extensible firmware interface system of the present invention.

Referring to FIG. 1 which is a flowchart of the present invention, in order to illustrate the procedure of the present invention, one can also refer to FIG. 2 which is a system chart of the extensible firmware interface of the present invention. In FIG. 2, the reason for naming the extensible firmware interface stored in a read-only memory 10 by "Extensible" is it has a mechanism for extending functions by adding driver modules and application modules (not shown) thereinto. If needed, these driver modules and application modules can be developed by programmers themselves according to the extensible firmware interface specification established by Intel Corporation, so as to execute special works. The following driving modules and selecting modules are produced in this way. In order to allow the present invention to be used in computer systems with legacy BIOS, a legacy BIOS 12 is thus stored in the extensible firmware interface system for users' choice of what system is to be used.

In FIG. 1, when a computer system incorporating extensible firmware interface and basic input/output system is powered on (Step S30), an EFI boot manager will be executed first to set up system initial values, and then drivers and applications for the extensible firmware interface are successively loaded (step S32). A booting element selecting program as a selecting module of the extensible firmware interface can choose to be operated under the operation environment of extensible firmware interface or the operation environment of legacy BIOS. When the operation environment of legacy BIOS is selected, it is transferred from the extensible firmware interface to the basic input/output system; first, a legacy OS support driver as a driving module which stored in an extensible firmware interface of a read-only memory 10 proceeds settings upon a north bridge (not shown) in the computer system to start a mapping random-access memory (not shown) having high speed access memory (Step S34). In this example, the section E and section F (E0000~F0000) of the mapping random-access memory are started.

Next, the legacy BIOS 12 stored in the read-only memory 10 is found out by the legacy OS support driver (Step 36), every compressed read-only memory file (ROM file) stored in the legacy BIOS is read out (Step S38), and these compressed ROM files are decompressed by the legacy OS support driver to be stored in the mapping memory (Step S40), allowing the computer system to read the ROM files to be read stored in the basic input/output system quickly.

Next, a warm reset vector is set up in the mapping memory by the legacy OS support driver (Step S42) to execute the action of warm reset, allowing the computer system to proceed a procedure of warm reset (Step S44). At this time, the computer system jumps to the address appointed by the warm reset vector (Step S46) and executes executable codes of the legacy BIOS (Step S48), so as to proceed the setup or test works of the system, peripherals and interrupt service routine. Then the computer system will start the conventional operating system such as Dos, Windows XP or other early Windows versions, and various application software programs can be used in accordance with the users' needs.

When a computer system booting is initialized, for the computer system incorporating extensible firmware interface and basic input/output system at the same time, some part of initializations will be repeatedly done by both the extensible firmware interface and the basic input/output system; therefore, it is necessary to execute the repeated actions on the extensible firmware interface as far as possible, so as to reduce the read-only memory space 10 occupied by the basic input/output system (as shown in FIG. 2).

Adding a setup utility in a computer system incorporating extensible firmware interface allows users to setup the system freely, and allows setup by using standard programming language tools, so that the extensible firmware interface has an excellent advantage for system development.

The advantage of the present invention is the extensible firmware interface system can be used by a general operating system while still retaining the flexibility of downwards-compatible, and adding the legacy BIOS in the extensible firmware interface system will not affect the operation environment of extensible firmware interface and thus can be used in old computer systems.

While the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention.

What is claimed is:

1. A resource compatible system for extensible firmware interface and basic input/output system, adapted to a computer system incorporating said extensible firmware interface and said basic input/output system at the same time; said computer system executes said extensible firmware interface system first after being powered on, and then when transferring to said basic input/output system, said resource compatible system executes the following steps:
   starting a mapping random access memory by a legacy OS support driver of said extensible firmware interface;
   finding out a legacy BIOS stored in a read-only memory by said legacy OS support driver;
   reading out a compressed ROM file stored in said legacy BIOS by said legacy OS support driver;
   decompressing said compressed ROM file by said legacy OS support driver and storing it in said mapping random access memory;
   setting up a warm reset vector in said mapping random access memory by said legacy OS support driver; and
   executing an action of warm reset by said legacy OS support driver to enable said computer system proceeding the warm reset procedure.

2. The resource compatible system as claimed in claim 1, wherein a booting element selecting program of said extensible firmware interface can choose to be operated under the operation environment of extensible firmware interface or the operation environment of legacy BIOS.

3. The resource compatible system as claimed in claim 1, wherein said legacy OS support driver starts said mapping random access memory through setup of a north bridge.

4. The resource compatible system as claimed in claim 1, wherein after said legacy OS support driver executes the action of warm reset, said computer system executes the following steps:
   jumping to the address appointed by said warm reset vector;
   executing executable codes of the legacy BIOS; and
   starting the legacy operating system.

5. A resource compatible system for extensible firmware interface and basic input/output system, adapted to a computer system incorporating said extensible firmware interface and said basic input/output system at the same time; said extensible firmware interface has a driving module, and said computer system executes said extensible firmware interface system first after being powered on, and then when transferring to said basic input/output system, said driving module executes the following steps:
   starting a mapping random access memory;
   finding out a legacy BIOS;
   reading out a compressed ROM file stored in said legacy BIOS;
   decompressing said compressed ROM file and storing it in said mapping random access memory;
   setting up a warm reset vector in said mapping random access memory; and
   executing an action of warm reset to enable said computer system proceeding the warm reset procedure.

6. The resource compatible system as claimed in claim 5, wherein a selecting module of said extensible firmware interface can choose to be operated under the operation environment of extensible firmware interface or the operation environment of legacy BIOS.

7. The resource compatible system as claimed in claim 5, wherein said driving module starts said mapping random access memory through setup of a north bridge.

8. The resource compatible system as claimed in claim 5, wherein after said driving module executes the action of warm reset, said computer system executes the following steps:
  jumping to the address appointed by the warm reset vector;
  executing executable codes o.f the legacy BIOS; and
  starting the legacy operating system.

9. A computer-readable recording medium adapted to a computer system incorporating extensible firmware interface and basic input/output system at the same time; said computer system executes said extensible firmware interface system first after being powered on, and then when transferring to said basic input/output system, said computer-readable recording medium storing computer instructions or computer executable codes for causing the computer to execute the following steps:
  starting a mapping random access memory by a legacy OS support driver of said extensible firmware interface;
  starting a mapping random access memory by a legacy OS support driver of said extensible firmware interface;
  reading out a compressed ROM file stored in said legacy BIOS by said legacy OS support driver;
  decompressing said compressed ROM file by said legacy OS support driver and storing it in said mapping random access memory;
  setting up a warm reset vector in said mapping random access memory by said legacy OS support driver; and
  executing an action of warm reset by said legacy OS support driver to enable said computer system proceeding the warm reset procedure.

10. The computer-readable recording medium as claimed in claim 9, wherein a booting element selecting program of said extensible firmware interface can choose to be operated under the operation environment of extensible firmware interface or the operation environment of legacy BIOS.

11. The computer-readable recording medium as claimed in claim 9, wherein said legacy OS support driver starts said mapping random access memory through setup of a north bridge.

12. The computer-readable recording medium as claimed in claim 9, wherein after said legacy OS support driver executes the action of warm reset, said computer system executes the following steps:
  jumping to the address appointed by said warm reset vector;
  executing executable codes of the legacy BIOS; and
  starting the legacy operating system.

* * * * *